US006582498B1

United States Patent
Sass et al.

(10) Patent No.: US 6,582,498 B1
(45) Date of Patent: Jun. 24, 2003

(54) METHOD OF SEPARATING CARBON DIOXIDE FROM A GAS MIXTURE USING A FLUID DYNAMIC INSTABILITY

(75) Inventors: Bruce M. Sass, Dublin, OH (US); James H. Saunders, Worthington, OH (US); Bruce F. Monzyk, Delaware, OH (US); Russell H. Barnes, Jr., Columbus, OH (US); Neeraj Gupta, Columbus, OH (US); Paul R. Webb, Canal Winchester, OH (US)

(73) Assignee: Battelle Memorial Institute, Columbus, OH (US)

( * ) Notice: Subject to any disclaimer, the term of this patent is extended or adjusted under 35 U.S.C. 154(b) by 15 days.

(21) Appl. No.: 09/849,944

(22) Filed: May 4, 2001

(51) Int. Cl.[7] .......................... B01D 53/14; B01D 19/00
(52) U.S. Cl. .................. 95/211; 95/236; 95/263; 96/202; 96/296; 96/299; 96/327
(58) Field of Search ............. 95/210, 211, 236, 95/263; 96/202, 290, 296, 299, 272, 322, 327

(56) References Cited

U.S. PATENT DOCUMENTS

| | | | |
|---|---|---|---|
| 1,749,920 A | * | 3/1930 | Modave |
| 1,866,193 A | * | 7/1932 | Coutant |
| 1,989,773 A | * | 2/1935 | Snow |
| 3,092,096 A | * | 6/1963 | Nett et al. |
| 3,748,828 A | * | 7/1973 | Lefebvre |
| 4,957,519 A | * | 9/1990 | Chen |
| 4,980,098 A | * | 12/1990 | Connery |
| 5,535,989 A | * | 7/1996 | Sen |
| 5,603,908 A | | 2/1997 | Yoshida et al. |
| 5,618,506 A | | 4/1997 | Suzuki et al. |
| 5,700,437 A | | 12/1997 | Fujii et al. |
| 5,736,115 A | | 4/1998 | Iijima et al. |
| 5,876,488 A | | 3/1999 | Birbara et al. |
| 5,904,908 A | | 5/1999 | Suzuki et al. |
| 6,375,717 B1 | * | 4/2002 | Petein |

FOREIGN PATENT DOCUMENTS

| | | |
|---|---|---|
| EP | 0 776 687 A1 | 6/1997 |
| EP | 0 798 029 A2 | 10/1997 |

OTHER PUBLICATIONS

Chinju et al., "String–of–Beads Flow of Liquids on Vertical Wires for Gas Absorption", AIChE Journal, vol. 46, No. 5, pp. 937–945 (May 2000).
Hattori et al., "Strings of Liquid Beads for Gas–Liquid Contact Operations", AIChE Journal, vol. 40, No. 12, pp. 1983–1992 (Dec. 1994).
"A Unique Solid Amine Sorbent . . . , " Greenhouse Gas Control Technologies, pp. 113–118 (1999).
"Solubility of Carbon Dioxide . . . , " J. Chem. Eng. Data 43, pp. 635–637 (1998).
"An Investigation of Some . . . ," Ind. Eng. Chem. Res. 36, pp. 1779–1790 (1997).

(List continued on next page.)

Primary Examiner—Duane S. Smith
(74) Attorney, Agent, or Firm—MacMillan, Sobanski & Todd, LLC

(57) ABSTRACT

In a method of separating carbon dioxide from a gas mixture, a liquid solvent flows down an array of vertical wires with the gas mixture flowing over the liquid. Once on the wire, the liquid quickly breaks up into drops of varying sizes, with each size moving down the wire at a different velocity. Large, faster moving drops overtake the small, slower moving drops to form even larger drops. As the drops fall, new drops are created behind the falling drops. Consequently, drops of a large range of sizes are forming, colliding, and mixing as they travel down the wire. During this process, gas molecules that have adsorbed onto the liquid surface are mixed into the interior of the solvent, resulting in highly effective mass transfer and gas absorption. This enhanced mass transfer allows greater flexibility in the choice of solvent and in the system design.

39 Claims, 3 Drawing Sheets

OTHER PUBLICATIONS

"Study on CO2 Removal . . . ", Greenhouse Gas Control Technologies, pp. 95–100 (1999).

"Comparative Study of Various . . . ," Studies in Surface Science and Catalysis 14, 669–672 (1998).

"Recent Design Developments . . . ," Trans. Am Inst. Chem. Engrs. 37, pp. 363–384 (1941).

"The Rate of Absorption . . . ," Trans Am Inst. Chem. Engrs. 37, pp. 827–852 (1941).

"Equilibrium Absorption of . . . ," Trans. Am Inst. Chem. Engrs. 32, pp. 27–48 (1935).

Performance of Packed Towers . . . , Trans. Am Inst. Chem. Engrs. 36, pp. 39–70 (1939).

"Uptake of Gas–Phase SO2 . . . ,", J. Phys. Chem. A. 104, pp. 7502–7510 (2000).

"Physicochemical Properties . . . ," J. Chem. Eng. Data 34, pp. 385–391 (1989).

"Feasibility, Modeling and . . . ," Environmental Progress 10:1, pp. 64–74 (1991).

"Mass Transfer Enhancement . . . ," Chemical Engineering Science 55, pp. 5851–5856 (2000).

"Mass Transfer with Complex . . . ," Chemical Engineering Journal 76, pp. 127–152 (2000).

"A Laboratory and Theoretical . . . ," Atmospheric Environment 34, pp. 2865–2871 (2000).

"Analysis of Mass Transfer . . . ," J. Aerosol Sci. 28:7, pp. 1233–1249 (1997).

"Chemical Reaction Effects . . . ," Off. Proc. Comb. Conf. (1993) [Abstract].

"Facilitated Transport of . . . , " ACS Symp. Ser. (1996) [Abstract].

"CO2 Recovery from Alkanol . . . ," J. Phys. IV France 9, pp. 349–353 (1999).

"Gas Sweetening", Hydrocarbon Processing, p. 82 (Jun. 1996).

"Correlation and Prediction of . . . ," Ind. Eng. Chem. Res. 36, pp. 2760–2765 (1997).

"The Enhancement of the Rate . . . ," Energy Convers. Mgmt. 38, pp. S69–S74 (1997).

Handbook of Chemical Technology and Pollution Control, pp. 250–253, 315–317, 320–321 (1998).

Encyclopedia of Chemical Technology, 4th Ed., vol. 5, pp. 44–45 (1999).

Encyclopedia of Chemical Technology, 4th Ed., vol. 2, pp. 664–666 (1999).

* cited by examiner

US 6,582,498 B1

METHOD OF SEPARATING CARBON DIOXIDE FROM A GAS MIXTURE USING A FLUID DYNAMIC INSTABILITY

TECHNICAL FIELD AND INDUSTRIAL APPLICABILITY OF THE INVENTION

The present invention is related generally to methods for separating components from gas mixtures, and more particularly to an improved method of separating carbon dioxide from a gas mixture using a fluid dynamic instability.

BACKGROUND OF THE INVENTION

The combustion of fossil fuels produces a stream of flue gas which contains carbon dioxide ($CO_2$) and other components. In order to control atmospheric carbon emissions, various separation technologies will be required to remove the $CO_2$ from the flue gas. However, there is a need to enhance the efficiency of $CO_2$ separation beyond what is currently available commercially. Current flue gas separation technologies include the use of solvents, cryogenic techniques, membranes, and solid sorbents. Each of these technologies can be performed on a large scale, but all are energy intensive when applied to capturing $CO_2$ in dilute streams, such as flue gas, which is approximately 15% by volume for coal combustion, 13% for oil, and 9% for natural gas.

Amine-based solvents are the most energy efficient conventional option for removing $CO_2$ from flue gas. However, energy consumption is inherently high due to the large dilutions with water that are needed to prevent corrosion of equipment and to avoid flow problems caused by viscosity increases for fast-reacting amines, such as monoethanolamine (MEA). In commercial MEA applications, a large volume of solvent (typically containing 70% to 88% water) must be heated to release a relatively small amount of gas and regenerate the solvent. In addition, the overall efficiency of traditional tower stripping designs suffers from mass-transfer rate limitations. Therefore, it would be desirable to provide an improved method of separating components such as carbon dioxide from flue gases or other gas mixtures.

SUMMARY OF THE INVENTION

The above objective as well as others not specifically enumerated are achieved by an improved method of separating a component from a gas mixture in accordance with the invention. In a first embodiment, the method is used to separate a non-aqueous component from a gas mixture. The method includes flowing a liquid solvent down a wire so that the solvent forms drops which flow down the wire. The formation and motion of the drops on the wire is caused by a fluid instability of the solvent. The fluid instability usually includes mixing of the content of the drops such that liquid solvent flows from the surface of the drops into the interior of the drops. Typically, the solvent forms drops of different sizes which collide with one another as they flow down the wire, causing mixing of the content of the drops. The gas mixture is flowed into contact with the solvent on the wire so that the solvent absorbs the non-aqueous component from the gas mixture. The fluid instability of the solvent increases the mass transfer rate of the absorption process.

In another embodiment of the method, a liquid solvent is flowed down a wire so that the solvent forms drops which flow down the wire. The flow of the drops down the wire creates fluid instability of the solvent. The solvent is reactive with the gas component. The gas mixture is flowed into contact with the solvent on the wire so that the solvent reacts with and absorbs the gas component. The fluid instability of the solvent increases the rate of reaction of the solvent with the gas component by at least about 50%, compared to the same reaction with the solvent in a fluid stable condition.

In a particular embodiment, the invention relates to a method of separating carbon dioxide from a gas mixture. A liquid solvent is flowed down a wire so that the solvent forms drops which flow down the wire. The flow of the drops down the wire creates fluid instability of the solvent. The solvent is reactive with carbon dioxide. A gas mixture containing carbon dioxide is flowed into contact with the solvent on the wire so that the solvent reacts with and absorbs the carbon dioxide from the gas mixture. The fluid instability of the solvent increases the mass transfer rate of the absorption process.

In another embodiment of the method, a liquid containing a solvent is flowed down a wire so that the liquid forms drops which flow down the wire. The flow of the drops down the wire creates fluid instability of the liquid. The solvent is reactive with the gas component. The liquid further contains an activator which promotes the reaction of the solvent with the gas component. The gas mixture is flowed into contact with the solvent on the wire so that the solvent reacts with and absorbs the component from the gas mixture. The fluid instability of the liquid increases the mass transfer rate of the absorption process.

In a further embodiment of the method, a liquid solvent is flowed down a wire so that the solvent forms drops which flow down the wire. The flow of the drops down the wire creates fluid instability of the solvent. The method includes an additional step of exciting the fluid instability of the solvent. The fluid instability can be excited by passive means, such as by placing obstacles on the wire and passing the flow of solvent over the obstacles. The fluid instability can also be excited by active means, such as by mechanically enhancing the instability by vibrating, twisting or translating the wire. The fluid instability can also be excited by heating the fluid on the wire. The gas mixture is flowed into contact with the solvent on the wire so that the solvent absorbs the component from the gas mixture. The fluid instability of the solvent increases the mass transfer rate of the absorption process.

In another embodiment of the method, the liquid solvent comprises a mixture of amine and water. The amine is selected to have physical properties such that the liquid solvent resists formation of solids and has suitable flow characteristics to flow down the wire sufficient to significantly increase the mass transfer rate.

Another embodiment of the invention is a method of stripping a gaseous component from a liquid solvent containing the component. In the method, a liquid solvent containing a gaseous component is flowed down a wire so that the solvent forms drops which flow down the wire. The flow of the drops down the wire creates fluid instability of the solvent. The liquid solvent is heated on the wire so that the gaseous component is released from the solvent. The fluid instability of the solvent increases the mass transfer rate of the stripping process.

Various objects and advantages of this invention will become apparent to those skilled in the art from the following detailed description of the preferred embodiments, when read in light of the accompanying drawings.

DETAILED DESCRIPTION AND PREFERRED EMBODIMENTS OF THE INVENTION

The present invention provides a more efficient and economical method for separating components from gas mixtures, in particular for separating $CO_2$ from flue gas. The method by which this is achieved is twofold. First, a novel gas-liquid contacting device is used that delivers a significant increase in the mass transfer performance, compared to conventional separation equipment, at a reduced pressure drop. The contacting device uses a fluid dynamic instability to enhance the absorption characteristics of a reactive fluid solvent. Second, an advanced solvent is used that requires less energy to regenerate, and that delivers improved performance properties compared to traditional solvents.

Gas-Liquid Contacting Device

Figure 1:
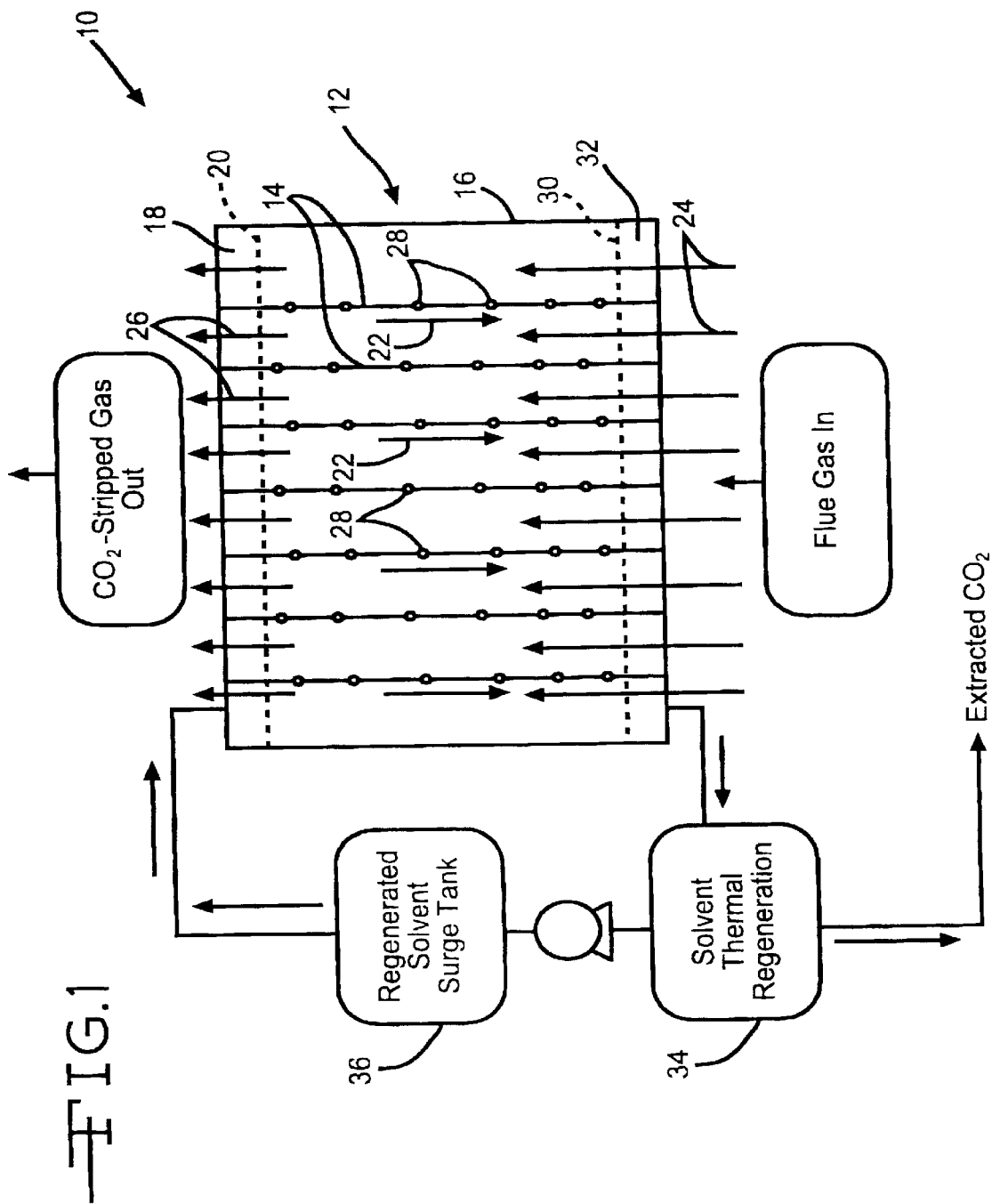
FIG. 1 is a schematic view of an apparatus, including a gas-liquid contacting device, for separating carbon dioxide from a gas mixture using the fluid dynamic instability method of the invention.

FIG. 1 illustrates an example of an apparatus 10 suitable for use in the method of the invention. Although the method will be described in relation to the illustrated apparatus, it is recognized that other types of apparatus are also suitable for use in the method. The apparatus includes a gas-liquid contacting device 12. The contacting device consists of an array of vertical wires 14 inside a housing 16. The wires can be any type of wires, strands, strings, threads or similar structures that are adapted for the flow of liquid solvent, as described below. The wires are made from a wettable material, or are coated with a wettable material. Typically, the wires are metal wires or plastic strands. The illustrated contacting device includes seven wires, although the number of wires will vary depending on the particular process. A laboratory scale device may include not, more than about 20 wires. However, a full-scale device may consist of hundreds of wires arranged in stackable trays. The actual number of wires used will depend on the rate at which $CO_2$ or other gaseous components must be removed from the gas stream. The length of the wires will also affect the number that is needed, because absorption capacity is proportional to the total surface area. Wire length would be determined by optimizing each particular process. The number of wires in a cross-sectional area depends on wire diameter, drop diameter, and design requirements for pressure drop. Generally, the wire density will be the maximum permitted by available space.

A liquid solvent is fed onto the wires 14 from a solvent feed reservoir 18 through a solvent distribution plate 20. The liquid solvent flows downward along the wires, as indicated by the arrows 22. At the same time, a dilute gas mixture of $CO_2$ (e.g., 9–14%) flows counter to the liquid solvent, as indicated by the arrows 24. Alternatively, a cross flow of the gas mixture could be used instead of a counter flow. In the illustrated embodiment, the gas mixture is flue gas which is fed into the housing through multiple nozzles (not shown) at the bottom of the housing. Preferably, the flue gas is cooled prior to the separation process. The flue gas flows into contact with the liquid solvent on the wires, and the solvent absorbs $CO_2$ from the flue gas. The $CO_2$-stripped flue gas exits the top of the housing through multiple openings (not shown), as indicated by the arrows 26.

When the liquid solvent is fed onto a wire, the liquid forms a cylindrical falling film attached to the wire. For sufficiently small wire diameters, the cylindrical shape is unstable and spontaneously breaks up into drops 28 on the wire. Preferably, the wire has a diameter between about 0.010 inch (0.025 cm) and about 0.100 inch (0.254 cm). The drops 28 of liquid solvent fall vertically down the wire. The shearing action of the wire on the falling drops causes a new cylindrical film to form behind the drop. This film, which is thinner than the original film, is also unstable and breaks up into smaller drops, repeating the original process on a smaller scale. Thus, each falling drop spawns smaller drops growing behind it. Consequently, a range of drop sizes exist on the wire. Because the largest drops fall the fastest, they overtake and collide with the smaller drops and grow in size. Therefore, drops are continuously being created, falling, then colliding and mixing with other drops.

The combination of liquid movement and drop recombination cause internal motion of the liquid solvent beneath the surface that enhances mixing of absorbed $CO_2$ into the bulk of the liquid. This fluid motion of the liquid solvent is referred to herein as "fluid dynamic instability". It is believed that the mixing of absorbed $CO_2$ into the bulk of the liquid solvent occurs in four main steps. First, as the cylindrical film on the wire breaks up into drops, it does so to minimize surface area. This forces absorbed $CO_2$ on the cylindrical surface to be moved into the interior of the liquid. Second, the velocity of the liquid solvent is forced to be zero at the wire surface, while the bulk of the liquid is moving downward. This results in a flow pattern within the falling drop which mixes fluid from the surface into the interior. Third, and probably most important, as the larger drops collide with smaller drops, the liquid from each drop is mixed together. Finally, a cylindrical film is formed behind the falling drop, again changing the surface area and causing mixing. The net result is not only mixing from the surface to the interior, but also axial mixing along the vertical flow path.

This mixing process reduces the concentration of $CO_2$ on the surface of the liquid solvent, below the value if mixing did not occur. The main benefit of this effect is that the chemical gradient across the interface is higher in the dynamic system than in a static system. As a result, the rate of mass transfer from the gas phase to the absorbent liquid phase is increased accordingly. The significance is that faster absorption improves the efficiency of the process, because less contact time is needed between the gas and the absorptive liquid solvent.

When the drops 28 of liquid solvent, loaded with $CO_2$, reach the bottom of the device 12, they flow through a solvent collection grate 30 into a $CO_2$-loaded solvent collection reservoir 32. The $CO_2$-loaded solvent flows from the device 12 to a thermal regeneration apparatus 34, where the liquid solvent is heated to remove $CO_2$. The $CO_2$ is removed for disposal. The regenerated liquid solvent is pumped to a surge tank 36, and then back into the solvent feed reservoir 18 at the top of the device 12.

Liquid Solvent

The liquid solvent for use in the method of the invention can be any type of solvent which is capable of absorbing the component from the gas mixture, and which is suitable for use in the gas-liquid contacting device. Liquid amines are known to be good solvents for absorbing $CO_2$ and other acid gases because they tend to be highly reactive and are miscible with water. However, optimization of the absorption process is complicated by the fact that high concentration gradients are needed at the absorber-absorbate interface for efficient mass transfer, yet the production of reaction products at the surface hinders further absorption. The same forces work to oppose the regeneration of the solvent. Carbon dioxide absorption by liquid amines is confounded by the fact that fast-reacting amines form viscous liquids when loaded with $CO_2$, require high temperatures (high energy consumption) for regeneration, and are the most easily degraded. The fast-reacting liquid amines are generally primary amines such as monoethanolamine (MEA). On the other hand, liquid amines with high loading capacity tend to react more slowly with $CO_2$. The slow-reacting liquid amines are generally tertiary amines such as methyldiethanolamine (MDEA). The reaction rate of secondary amines is generally between those of primary and tertiary amines. In principle, the performance of any alkanol amine for sorbing $CO_2$ can be improved by the contactor device. This includes all amines with general structure $R_1R_2NCH_2CH(OH)CH_2OH$, where $R_1$ and $R_2$ are alkyl groups (i.e. —$CH_3$ containing between one and 3 carbon units each). Most preferably, the amines are tertiary amines or hindered secondary amines, such as MDEA, 2-(dimethylamino)-ethanol (DEAE), 2-amino-2-methyl-1-propanol (AMP), 2-amino-2-methyl-1,3-propanediol, 2-(2-hydroxyethyl)-piperidine (HEP), and mixtures thereof. In addition to amine solvents, other classes of liquids could be chosen to function with the contactor. These alternative solvents include reactive aqueous mixtures of carbonates, such as potassium carbonate (bicarbonate) and sodium carbonate (bicarbonate), strong bases, such as sodium hydroxide, potassium hydroxide, and aqueous ammonia, as well as non-reactive (physical) solvents. The solvent can be used in a mixture with water, certain oils, or another other carrier that is compatible with the absorption process.

The fluid dynamic instability method of the invention increases the rate of mass transfer across the gas-liquid boundary by mechanically sweeping away the reaction products from the solvent surface into the interior of the solvent, thereby reducing the accumulation of reaction products at the surface of the solvent which would hinder further absorption. The fluid dynamic instability is expected to increase the rate of mass transfer by at least about 10% compared to the same reaction with the liquid solvent in a normal fluid condition, and typically at least about 30%; however, a many-fold increase in mass transfer rate could be possible. Experimentally, this rate of mass transfer can be compared by measuring absorption of $CO_2$ using the gas-liquid contacting device with the wires versus with free falling drops of solvent. A "normal fluid condition" means a bulk fluid whose surface is not highly disturbed as in the drops undergoing motion along the wire. The fluid dynamic instability approach of the invention enables the use of the slower-reacting liquid amines in the absorption process, such as secondary and tertiary amines. The fluid dynamic instability method enhances the kinetics of absorption by tertiary amines such as MDEA, making them competitive with primary amines, but without their economic and operational disadvantages.

For example, MDEA requires less energy to regenerate than MEA and is much less corrosive to equipment. Further, MDEA does not form a viscous liquid phase or salt cake when highly loaded with $CO_2$. Conversely, reactions of $CO_2$ with MEA form stable carbamates which increase viscosity and can precipitate solid carbonates that can cause clogging of the apparatus. Using tertiary amines also reduces amine degradation, requiring less make-up volume, and lower maintenance costs. Another key advantage of tertiary amines is that $CO_2$ desorption can be conducted at a lower temperature due to lower $pK_a$ (higher acidity) of the amine. In addition, tertiary amines have lower vapor pressure, lower toxicity, and are more environmentally favorable than primary amines. For example, the LD50 (oral for rat) is 2,050 mg/kg for MEA and 4,780 for MDEA; the LD50 (intraperitoneal for mouse) is 50 for MEA and 500 for MDEA; eye irritation (for rabbit) is 0.763 milligrams for MEA and 20 milligrams for MDEA. These health data, together with lower vapor pressure of MDEA (<0.01 mm-Hg compared to 0.4 mm-Hg for MDEA, both at 20° C.), would make MDEA preferred for medical applications.

Because a tertiary amine such as MDEA is less corrosive to equipment than a primary amine such as MEA, the tertiary amine can be used at a higher concentration in the liquid solvent. When used as a solvent, a primary amine such as MEA is usually highly diluted in water (typically about 70% to 88% water and about 12% to 30% MEA, by weight). The high dilution makes it costly to separate the water from the amine after the absorption process. In contrast, a tertiary amine such as MDEA can be used at a high concentration in a mixture with water, for example from about 35% to about 70% amine and from about 30% to about 65% water, by weight. The reduced water content makes it less costly to separate water from the amine after the absorption process.

When the liquid solvent comprises a mixture of amine and water, preferably the amine is selected to have physical properties such that the solvent resists formation of solids and has suitable flow characteristics to flow down the wire sufficient to significantly increase the mass transfer rate of the process. The physical properties affecting the formation of solids and the flow characteristics are principally surface tension, viscosity, and vapor pressure.

Activator

To further speed up the absorption process when using a slow-reacting solvent, an activator can be added which promotes the reaction of the solvent with the gas component to be separated. For example, when the component is carbon dioxide and the liquid solvent is a tertiary amine, some examples of suitable activators include: monoethanolamine; piperazine; 2-methylpiperazine; 2,3-dimethylpiperazine; 2,5-dimethylpiperazine; solutions of primary and secondary amines; phosphoric acid; and mixtures thereof. The activator can be used in a relatively small amount, typically between 0.2 and 10%, and usually between about 0.5 and 5%, by weight. The liquid mixture may contain, by weight, from about 35% to about 70% solvent, from about 30% to about 65% water, and from about 0.2% to about 10% activator. In one embodiment of the invention, a mixture is used containing about 49% MDEA, about 50% water, and about 1% piperazine.

Excitation of the Fluid Instability

The separation method of the invention can be further improved by exciting the fluid dynamic instability of the solvent. The instability can be excited by both passive and active excitation. Passive excitation of the instability involves changing the flow of the liquid solvent on the wire by passive means, such as passive mechanical means, in a manner that increases the fluid dynamic instability of the solvent. For example, passive excitation may involve placing obstacles to liquid flow at discrete points on the wire, and passing the flow of solvent over the obstacles. The size, shape, and spatial distribution of the obstacles can be varied. Some specific examples include using a plastic strand having small knots spaced about every 4 inches (10 cm) along the strand, or using a 0.029 inch (0.074 cm) diameter metal wire having winds of 0.020 inch (0.051 cm) wire tied every 1.5 to 3 inches (3.8 to 7.6 cm) around the wire. Passing the liquid solvent over the obstacles increases the mass transfer rate of the process, causing faster absorption of $CO_2$ from the gas. This improvement is believed to be caused by enhanced mixing inside the liquid drops of solvent as they pass over the obstacles on the strand. As an alternative to placing obstacles on the wire, the wire itself may be bent, tied or otherwise shaped in a manner that increases the fluid dynamic instability of the solvent.

Figure 2:
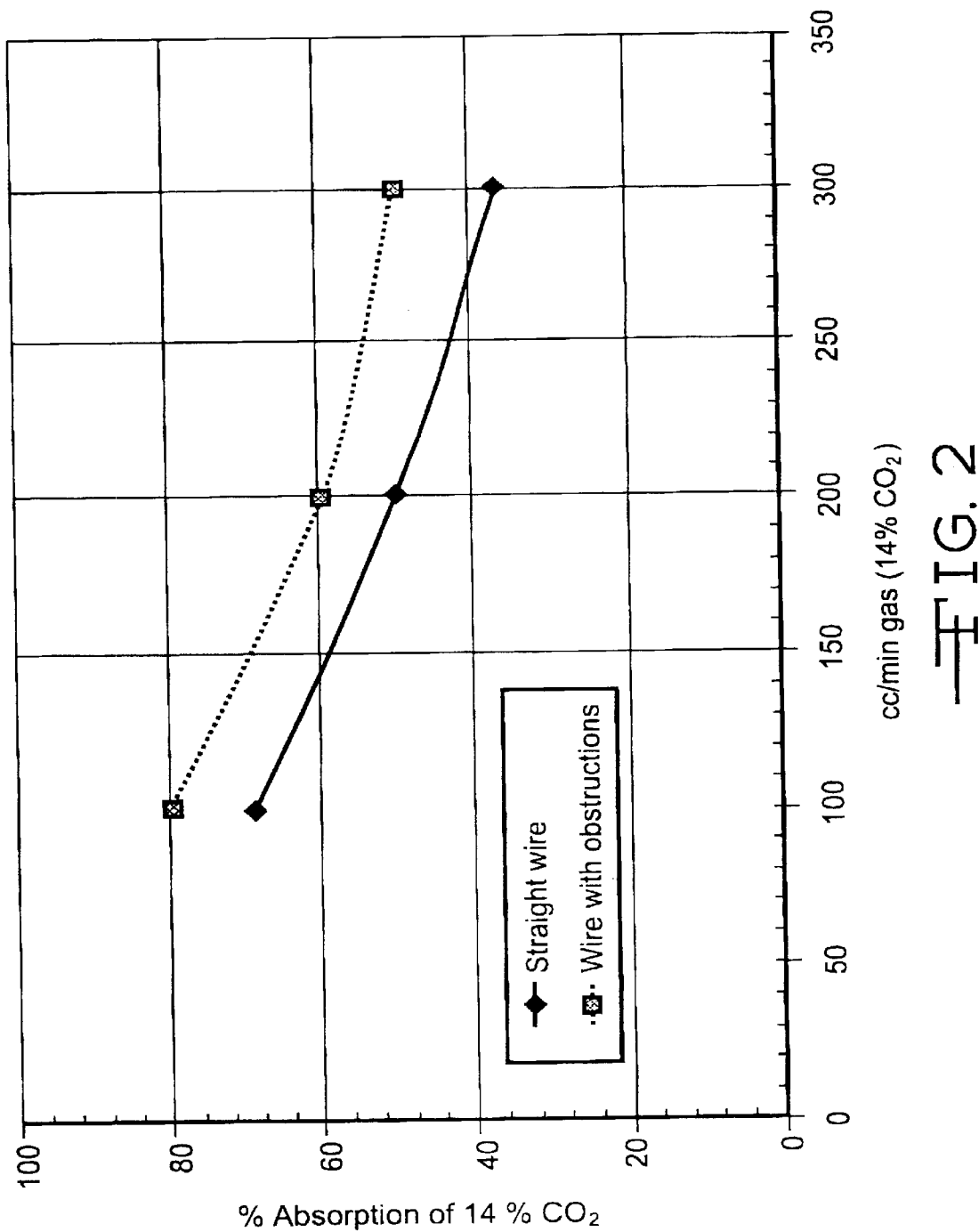
FIG. 2 is a plot of $CO_2$ absorption versus gas flow rate using the method of the invention, comparing a method that uses excitation of the fluid instability against a method without excitation.

Experiments with MDEA solutions were conducted using apparatus similar to that shown in FIG. 1. In these experiments it was desired to determine whether $CO_2$ uptake could be enhanced by changing the drop pattern by placing obstructions along the wire. This was done by tying winds of 0.020 inch (0.051 cm) wire every 1.5 to 3 inches (3.8 to 7.6 cm) around a 0.029 inch (0.074 cm) vertical wire. Solutions were made using 49% MDEA, 1% MEA, and 50% water, by weight. Various solution flowrates were used, ranging from 1 g/min to 10 g/min. The results of experiments conducted at a solution flowrate of 10 g/min are shown in FIG. 2. It is apparent that obstructions along the wire caused faster absorption of $CO_2$ from the gas, which is attributed to enhanced mixing inside the fluid drops.

The fluid instability can also be excited by active means. Active excitation of the instability involves changing the flow of the liquid solvent on the wire by active means in a manner that increases the fluid dynamic instability of the solvent. The active excitation may involve exciting the liquid solvent, the wire, and/or the surrounding air. The active means may include active mechanical means. Several means of actively exciting the fluid instability by mechanical means can be envisaged. For example, the fluid instability can be excited by causing motion of the wire. One way is to have the wires vibrate normal to the wire axis, similar to a guitar string, to create a superposition of harmonic vibrational modes onto the wire. Another way is to vibrate the wire longitudinally, as in an up and down oscillatory motion, to increase the effect of the droplets sliding along the wire. Other means of accomplishing a mechanically enhanced instability is to have the wires rotate by incorporating a twisting mechanism, or translate continuously, as with a pulley system. Active excitation is believed to increase the mass transfer rate of the process by increasing the growth rate and collision rate of the drops of liquid solvent.

Any suitable vibratory source can be used for the active excitation, such as piezoelectric, acoustic, or ultrasonic. For example, the wire and/or liquid solvent can be shaken or vibrated with a piezoelectric or other transducer, or with a mechanical shaker. Preferably, the piezoelectric device or mechanical shaker can be operated at varied frequencies. Active excitation by shaking or vibration is believed to force preferred unstable waves to grow more rapidly in the liquid solvent. This could allow some droplet sizes to grow more rapidly than others and dramatically change the collision dynamics. Careful selection of the forcing spectrum may substantially increase the mass transfer rate. By controlling the speed of droplet generation and the droplet size distribution, the active excitation may also influence mixing during film formation, drop creation, drop motion as well as drop collision. One embodiment of the invention uses piezoelectric bimorphs or electrically driven shaker heads mounted directly on a flexible reservoir just upstream of the feeding nozzle to the strands. The inlet feed to the reservoir is designed with an opening in such a way that liquid solvent cannot be pushed upstream from the source. Alternatively, if individual flexible tubes feed each wire, the central feeder tube could be directly excited. The wires could be vibrated in desired modes by moving, at a prescribed frequency and amplitude, the top platen or bottom headers that hold the wires. Acoustic vibrations can be used to actively excite the liquid solvent, the wires, or the surrounding air. Ultrasonic vibrations can also be used for the active excitation, for example by introducing vibrations to the reservoir of liquid solvent feeding the solvent onto the wires.

Another way to excite the fluid instability by active means is to control the fluid temperature. The fluid temperature can be controlled by any suitable means, such as by electrical resistance heating or by using a heat transfer fluid. In the first case, if the wire is made of a high resistance material, such as nichrome, an electric current could be applied to raise the temperature of the wire as well as the fluid contacting it. On the other hand, the wires could have a hollow core through which a heat transfer fluid is pumped to either raise or lower the temperature of the wire and the contacting fluid. The temperature of the fluid could also be raised by use of an external heater or other means. The purpose of raising the temperature could be to lower the viscosity of the fluid to maintain optimum droplet dynamics to compensate for the viscosity increase due to the solvent absorbing $CO_2$. The purpose of lowering the temperature could be to improve absorption characteristics.

Advantages of the Method

As an alternative to separation technologies such as packed beds, the fluid dynamic instability method of the invention offers the following potential technical benefits:

High rates of $CO_2$ absorption from the flue gas, due to increased mixing of $CO_2$ into the liquid.

Low pressure drop, because the flue gas does not need to follow a tortuous path around packing material. This reduces parasitic energy costs.

Reduced solvent loss due to entrainment, because the liquid solvent adheres to the wire by surface tension and fluid forces. In contrast, packed bed and spray systems have regions containing freely falling drops, which are more likely to become entrained in the flue gas.

Lower cost to regenerate the solvent, due to a substantial reduction in reboiler duty. Calculations show that the MDEA system can achieve a duty cycle of 0.72 lb. (0.33 kg) steam/lb. (0.45 kg) $CO_2$, compared to typical 1 lb. (0.45 kg) steam/lb. (0.45 kg) $CO_2$ (28% savings). At a steam cost of roughly $4/ton, the savings can become quite large for coal-burning power plant: approximately $2–4 million/year operating cost for a 500 $MW_e$ unit.

Reduction in separator size and cost, because the wires should occupy a smaller volume than conventional packing material. Because of the geometry, the interfacial area between the gas and liquid remains high.

Inexpensive assembly, because a molded or extruded set of plastic strands and feeding trays could be made in a stackable concept.

Reduction in the amount of solvent required, and hence the cost, because the wire does not absorb significant amounts of liquid, as conventional packing does.

Reduced energy cost because more concentrated solvent solutions may be used, compared to relatively dilute aqueous solutions currently in use. Heating large amounts of water to expel sorbed $CO_2$ currently adds high cost to amine-based separation processes.

Very robust fluid dynamic instability technology. Consequently, a system based on this technology can be operated continuously and for long periods without diminishing the quality of performance, provided maintenance practices are in place. In addition, stable characteristics make this technology ideal for treating slipstreams for continuous gas purification. This performance behavior should be favorable toward applications in which concentrations of target substances are variable with time.

Potential Applications

The fluid dynamic instability method of the invention can be used to separate $CO_2$ from flue gas at power plants that burn fossil fuels (especially coal). In addition to the power generation industry, the petrochemical industry is also interested in scrubbing $CO_2$ from natural gas.

It is evident that the same principles of operation that apply to $CO_2$ separation can also be applied to other types of gas separations. Some examples of additional applications for this technology are as follows:

First, the technology could be used to purify methane produced by anaerobic digestion of biomass. Off-gases typically contain high percentages of $CO_2$ and sulfur-containing gases (e.g., $SO_2$, COS, and $H_2S$) that cause corrosion problems due to acid formation when combined with water. Simultaneous scrubbing of $CO_2$ and sulfur could be performed to produce an enriched methane stream that may only require water removal before pipeline transport.

Second, the technology could be used to scrub $CO_2$ and other gases from air supplies onboard ships, submarines, and large buildings. A device of appropriate size could be incorporated into HVAC systems to perform these functions.

Third, the technology could be used to purify breathing gas in medical systems applications. For example, it could be used in a recycle system to remove $CO_2$ from anesthesia gas.

Fourth, there is considerable potential for performing other gas phase separations with this same system design. This could include removal of $SO_2$, $NO_x$, $H_2S$, COS, HCN, $NH_3$, water vapor, and alkylene oxide, for any purpose, such as specialty gas production, chemical processing plants, sewage off-gas treatment, and removal of nuisance odors.

Use of the Gas-Liquid Contacting Device as a Gas Stripper

Another embodiment of the method is to operate the gas-liquid contacting device as a gas stripper, rather than as an absorber. In stripper mode, $CO_2$-rich solvent would be flowed along the wire, forming droplets as described previously. However, the liquid solvent is heated so that the gaseous component is released from the solvent. The solvent can be heated by heating the wire, for example electrically (as described above) or by other means. The solvent can also be heated by applying external heat to the solvent, by increasing the ambient temperature inside the device, or by other heating methods. Heating the liquid solvent drives the reaction in the opposite direction and causes the solvent to release bound $CO_2$. Solvent regeneration is essential to $CO_2$ capture, because it is intended to be a closed loop process.

All the advantages mentioned previously of creating a fluid instability for enhancing absorption of a gas component would also apply to desorbing the same component. Thus, in reverse mode, the concept offers an improved way to regenerate a solvent. The process can apply to other gaseous components besides $CO_2$.

Figure 3:
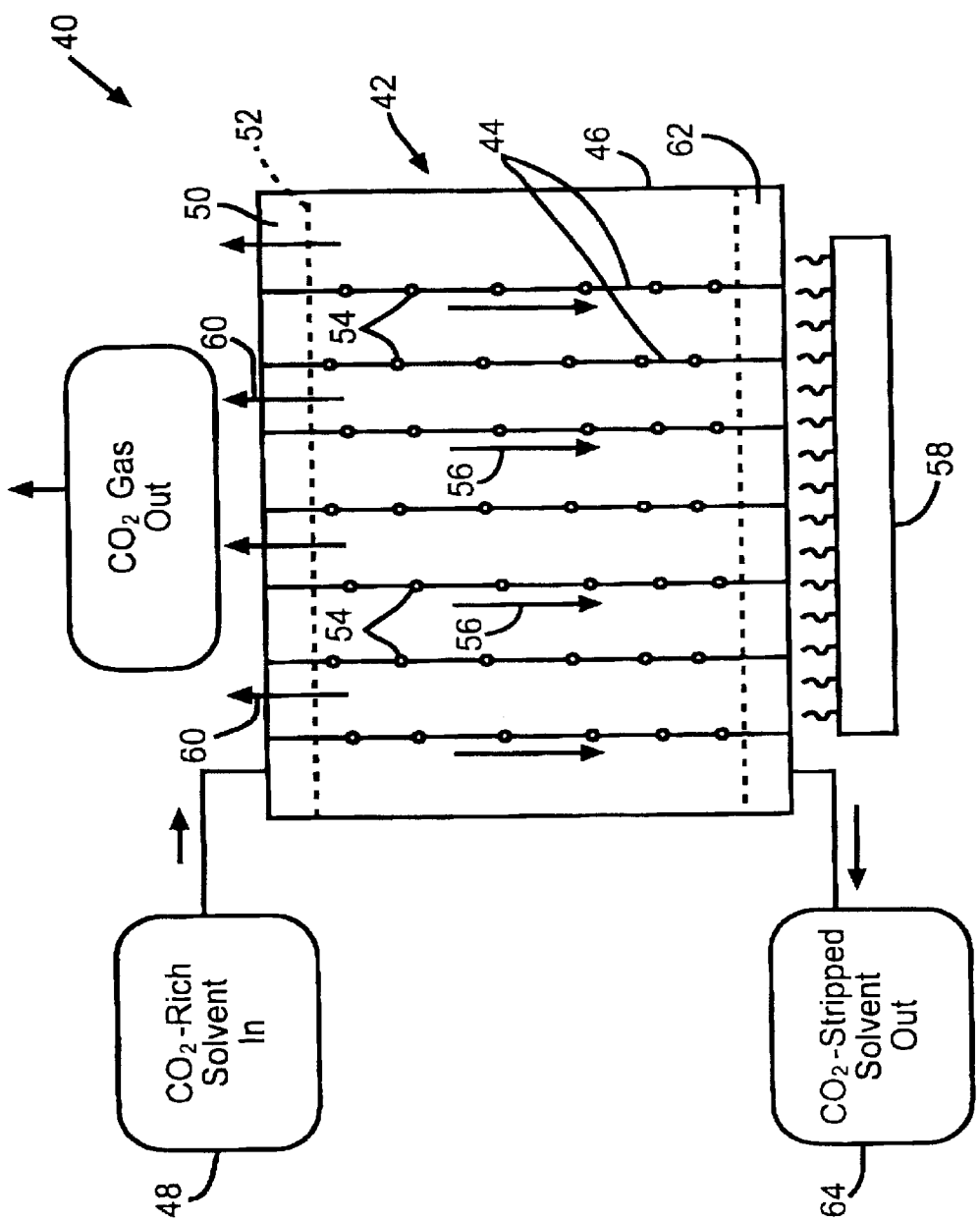
FIG. 3 is a schematic view of an apparatus, including a gas-liquid contacting device, for stripping carbon dioxide from a $CO_2$-rich solvent using the fluid dynamic instability method of the invention.

FIG. 3 illustrates an example of an apparatus 40 suitable for use in the gas stripping method. The apparatus includes a gas-liquid contacting device 42. The contacting device consists of an array of vertical wires 44 inside a housing 46. A $CO_2$-rich liquid solvent 48 is fed to a solvent feed reservoir 50 of the device. The solvent is fed onto the wires through a solvent distribution plate 52. The solvent flows downward and breaks up into multiple drops 54 which flow down the wires, as indicated by the arrows 56. As the drops of solvent flow down the wires, the ambient temperature inside the device is increased by use of a heating device 58. Heating the solvent causes the solvent to release bound $CO_2$. The released $CO_2$ flows upward from the drops and exits through openings (not shown) in the top of the device, as indicated by the arrows 60. The $CO_2$-stripped solvent reaches the bottom of the device and flows into a collection reservoir 62. From the reservoir, the $CO_2$-stripped solvent 64 flows out of the device.

The principle and mode of operation of this invention have been described in its preferred embodiments. However, it should be noted that this invention may be practiced otherwise than as specifically illustrated and described without departing from its scope.

What is claimed is:

1. A method of separating a non-aqueous component from a gas mixture comprising the steps of:

flowing a liquid solvent down a wire so that the solvent forms drops which flow down the wire, the flow of the drops down the wire creating fluid instability of the solvent; and flowing the gas mixture into contact with the solvent on the wire so that the solvent absorbs the non-aqueous component from the gas mixture, the fluid instability of the solvent increasing the mass transfer rate of the absorption process.

2. A method according to claim 1 wherein the fluid instability includes mixing of the content of the drops such that liquid solvent flows from the surface of the drops into the interior of the drops.

3. A method according to claim 1 wherein the solvent forms drops of different sizes which collide with one another as they flow down the wire, causing mixing of the content of the drops.

4. A method according to claim 1 wherein the gas component is selected from the group consisting of $CO_2$, $NO_x$, $SO_x$, $H_2S$, COS, HCN, $NH_3$, alkylene oxide, water vapor, and mixtures thereof.

5. A method according to claim 1 wherein the gas component is selected from the group consisting of $CO_2$, $NO_x$, and mixtures thereof.

6. A method according to claim 1 wherein the liquid solvent comprises a secondary or tertiary amine.

7. A method according to claim 1 wherein the liquid solvent comprises a tertiary amine.

8. A method according to claim 7 wherein the tertiary amine comprises methyldiethanolamine.

9. A method according to claim 7 wherein the tertiary amine is mixed with water before flowing the amine down the wire, the mixture comprising, by weight, from about 35% to about 70% amine and from about 30% to about 65% water.

10. A method of separating a component from a gas mixture comprising the steps of:

flowing a liquid solvent down a wire so that the solvent forms drops which flow down the wire, the flow of the drops down the wire creating fluid instability of the solvent, the solvent being reactive with the gas component; and flowing the gas mixture into contact with the solvent on the wire so that the solvent reacts with and absorbs the gas component, the fluid instability of the solvent increasing the rate of reaction of the solvent with the gas component by at least about 10% compared to the same reaction with the solvent in a fluid stable condition.

11. A method according to claim 10, wherein the fluid instability of the solvent increases the rate of reaction of the solvent with the gas component by at least about 30%.

12. A method according to claim 10 wherein the gas component is selected from the group consisting of $CO_2$, $NO_X$, $SO_X$, $H_2S$, COS, HCN, $NH_3$, alkylene oxide, water vapor, and mixtures thereof.

13. A method according to claim 10 wherein the gas component is selected from the group consisting of $CO_2$, $NO_X$, and mixtures thereof.

14. A method according to claim 10 wherein the liquid solvent comprises a secondary or tertiary amine.

15. A method according to claim 10 wherein the liquid solvent comprises a tertiary amine.

16. A method according to claim 15 wherein the tertiary amine comprises methyldiethanolamine.

17. A method according to claim 10 wherein the liquid solvent comprises, by weight, from about 35% to about 70% tertiary amine and from about 30% to about 65% water.

18. A method of separating carbon dioxide from a gas mixture comprising the steps of:

flowing a liquid solvent down a wire so that the solvent forms drops which flow down the wire, the flow of the drops down the wire creating fluid instability of the solvent, the solvent being reactive with carbon dioxide; and flowing a gas mixture containing carbon dioxide into contact with the solvent on the wire so that the solvent reacts with and absorbs the carbon dioxide from the gas mixture, the fluid instability of the solvent increasing the mass transfer rate of the absorption process.

19. A method according to claim 18 wherein the fluid instability includes mixing of the content of the drops such that liquid solvent flows from the surface of the drops into the interior of the drops.

20. A method according to claim 18 wherein the solvent forms drops of different sizes which collide with one another as they flow down the wire, causing mixing of the content of the drops.

21. A method according to claim 18 wherein the liquid solvent comprises a secondary or tertiary amine.

22. A method according to claim 18 wherein the liquid solvent comprises a tertiary amine.

23. A method according to claim 22 wherein the tertiary amine comprises methyldiethanolamine.

24. A method according to claim 18 wherein the liquid solvent comprises, by weight, from about 35% to about 70% tertiary amine and from about 30% to about 65% water.

25. A method of separating a component from a gas mixture comprising the steps of:

flowing a liquid containing a solvent down a wire so that the liquid forms drops which flow down the wire, the flow of the drops down the wire creating fluid instability of the liquid, the solvent being reactive with the gas component, and the liquid further containing an activator which promotes the reaction of the solvent with the gas component; and flowing the gas mixture into contact with the solvent on the wire so that the solvent reacts with and absorbs the component from the gas mixture, the fluid instability of the liquid increasing the mass transfer rate of the absorption process.

26. A method according to claim 25 wherein the component is carbon dioxide, the liquid solvent is a tertiary amine, and the activator is selected from the group consisting of monoethanolamine; piperazine; 2-methylpiperazine; 2,3-dimethylpiperazine; 2,5-dimethylpiperazine; solutions of primary and secondary amines; phosphoric acid; and mixtures thereof.

27. A method according to claim 25 wherein the liquid comprises, by weight, from about 35% to about 70% solvent, from about 30% to about 65% water, and from about 0.2% to about 10% activator.

28. A method of separating a component from a gas mixture comprising the steps of:

flowing a liquid solvent down a wire so that the solvent forms drops which flow down the wire, the flow of the drops down the wire creating fluid instability of the solvent;

exciting the fluid instability of the solvent; and flowing the gas mixture into contact with the solvent on the wire so that the solvent absorbs the component from the gas mixture, the fluid instability of the solvent increasing the mass transfer rate of the absorption process.

29. A method according to claim 28 wherein the fluid instability of the solvent is excited by changing the flow of liquid solvent on the wire by passive mechanical means.

30. A method according to claim 28 wherein the fluid instability of the solvent is excited by placing obstacles on the wire and passing the flow of solvent over the obstacles.

31. A method according to claim 28 wherein the fluid instability of the solvent is excited by causing motion of the wire.

32. A method according to claim 28 wherein the fluid instability of the solvent is excited by one of vibrating the wire normal to the wire axis, vibrating the wire longitudinally, and rotating the wire.

33. A method according to claim 28 wherein the fluid instability of the solvent is excited by heating the solvent.

34. A method according to claim 28 wherein the component is a non-aqueous component.

35. A method of separating carbon dioxide from a flue gas comprising the steps of:

flowing a liquid solvent down a wire so that the solvent forms drops which flow down the wire, the flow of the drops down the wire creating fluid instability of the solvent, the solvent being reactive with carbon dioxide, and the solvent comprising a mixture of tertiary amine and water; and flowing a flue gas containing carbon dioxide into contact with the solvent on the wire so that the solvent reacts with and absorbs the carbon dioxide from the flue gas, the fluid instability of the solvent increasing the mass transfer rate of the absorption process.

36. A method of separating a component from a gas mixture comprising the steps of:

flowing a liquid solvent, comprising a mixture of amine and water, down a wire so that the solvent forms drops which flow down the wire, the flow of the drops down the wire creating fluid instability of the solvent; and flowing the gas mixture into contact with the solvent on the wire so that the solvent absorbs the component from the gas mixture, the fluid instability of the solvent increasing the mass transfer rate of the absorption process;

the method including selecting the amine to have physical properties such that the liquid solvent resists formation of solids and has suitable flow characteristics to flow down the wire sufficient to significantly increase the mass transfer rate.

37. A method of stripping a gaseous component from a liquid solvent containing the component, the method comprising the steps of:

flowing a liquid solvent containing a gaseous component down a wire so that the solvent forms drops which flow down the wire, the flow of the drops down the wire creating fluid instability of the solvent; and heating the liquid solvent on the wire so that the gaseous component is released from the solvent, the fluid instability of the solvent increasing the mass transfer rate of the stripping process.

38. A method according to claim 37 wherein the fluid instability includes mixing of the content of the drops such that liquid solvent flows from the interior of the drops to the surface of the drops.

39. A method according to claim 37 wherein the gaseous component is selected from the group consisting of $CO_2$, $NO_X$, $SO_X$, $H_2S$, COS, HCN, $NH_3$, alkylene oxide, water vapor, and mixtures thereof.

* * * * *